No. 830,139. PATENTED SEPT. 4, 1906.
J. E. DOWDEN.
HAY LOADER.
APPLICATION FILED NOV. 14, 1904.
4 SHEETS—SHEET 3.
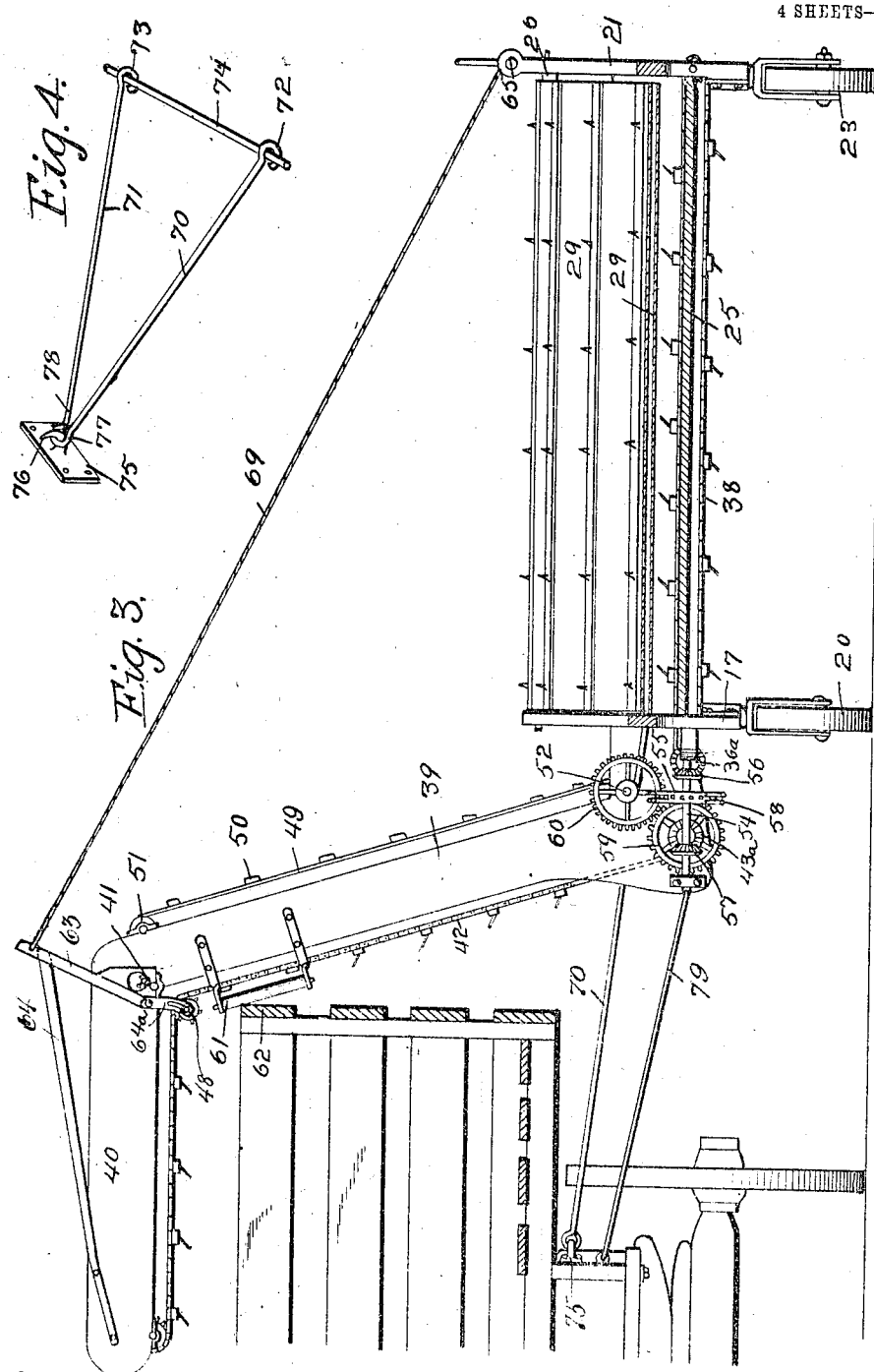
Witnesses
Inventor J. E. Dowden

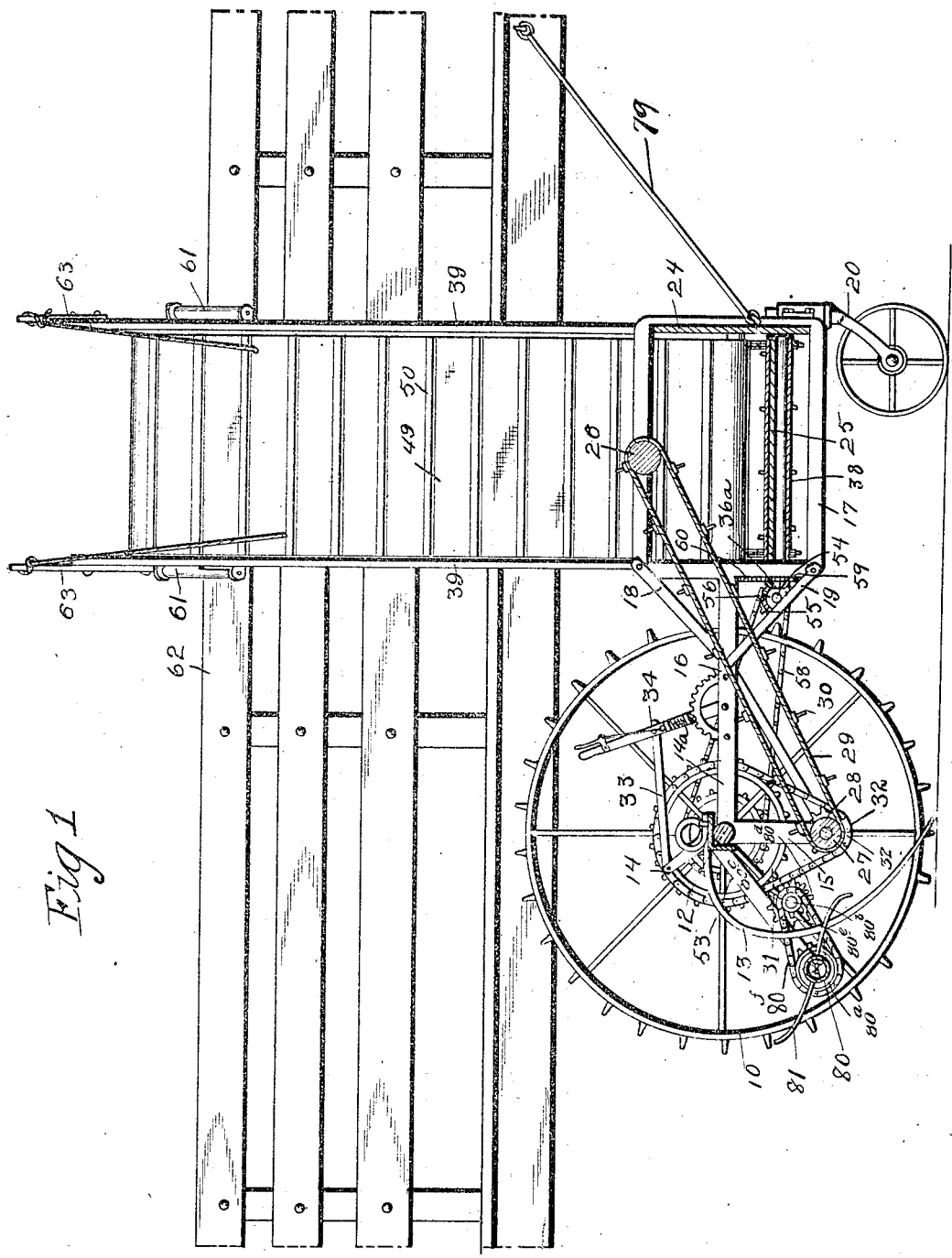

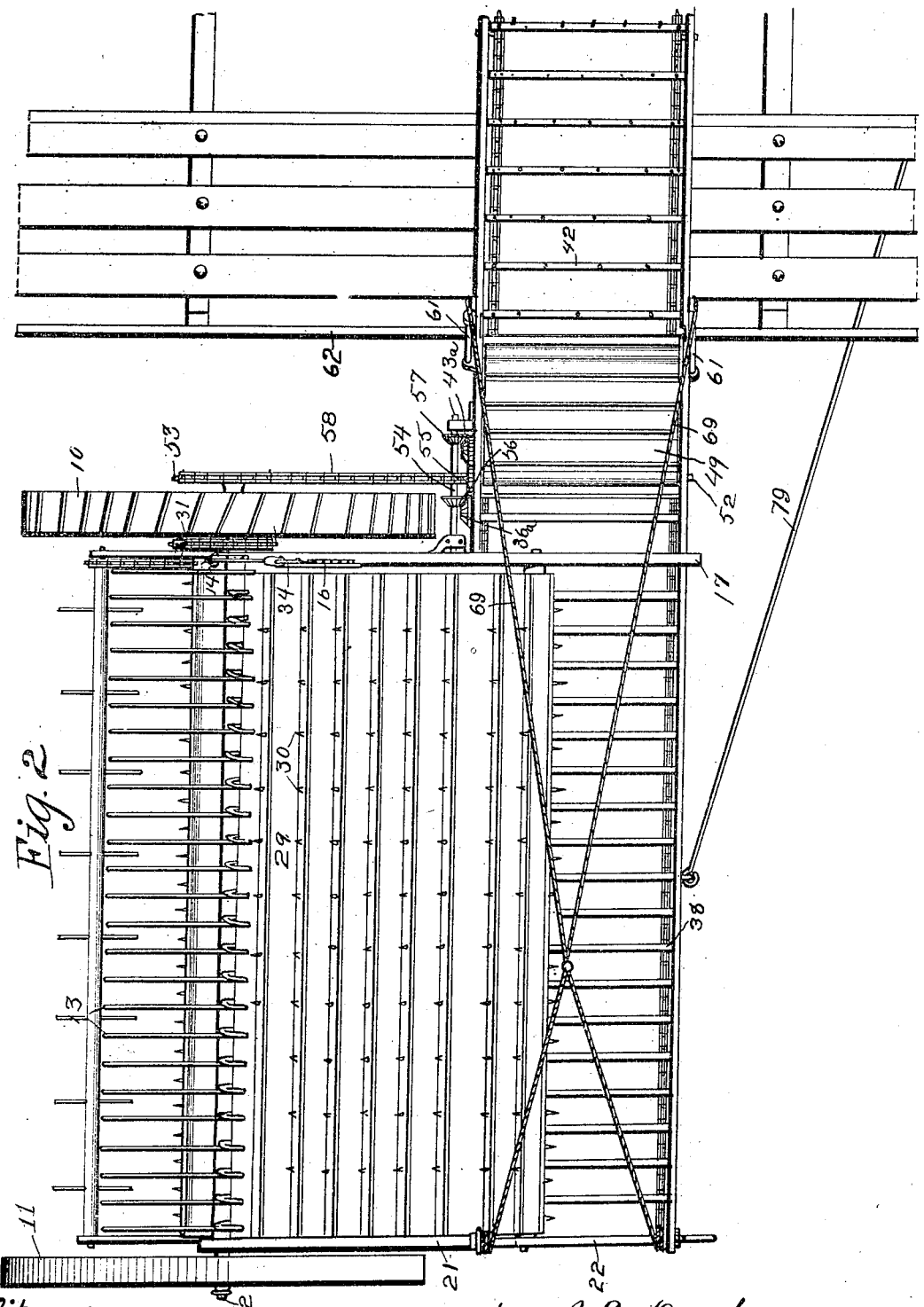

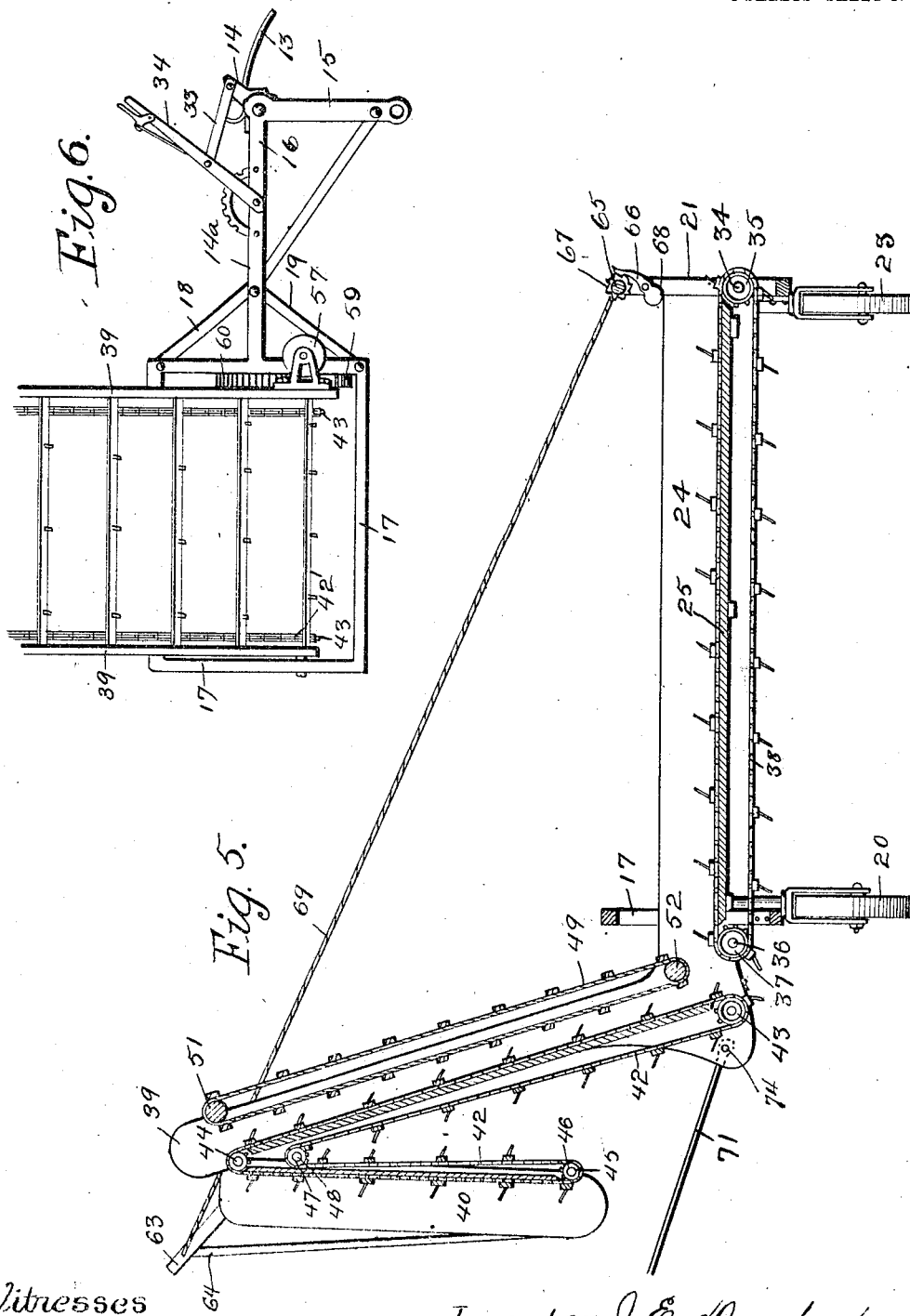

UNITED STATES PATENT OFFICE.

JOHN E. DOWDEN, OF MANCHESTER, SOUTH DAKOTA.

HAY-LOADER.

No. 830,139.

Specification of Letters Patent.

Patented Sept. 4, 1906.

Application filed November 14, 1904. Serial No. 232,589.

*To all whom it may concern:*

Be it known that I, JOHN E. DOWDEN, a citizen of the United States, residing at Manchester, in the county of Kingsberry and State of South Dakota, have invented a certain new and useful Hay-Loader, of which the following is a specification.

The objects of my invention are to provide a device for raking hay and elevating the hay as it is raked to a wagon which is to be placed at one side of the rake proper.

A further object is to provide a side-delivery rake and loader which will cause all of the hay on the ground over which the rake travels to be picked up cleanly, carried forwardly, and then elevated to a point of discharge at one side of the rake.

A further object is to provide means for attaching my device to the ordinary wagon-body in such a way that it will be maintained a certain distance away from the wagon-body, and, further, to provide means for supporting the elevating-carrier in position relative to the hay-rack which is placed on the body of the wagon, and to provide an elevating-carrier which is designed to elevate the hay onto the wagon to any desirable height.

A further object is to provide an elevating-carrier which can be easily folded into a portable position—that is, the outer portion of the carrier can be folded against the bottom of the inner portion of the carrier.

A further object is to provide a device in which the hay is raked up in the ordinary manner—that is, the ordinary frame of a hay-rake may be used with a few attachments to it for supporting and maintaining in position the elevating mechanism.
A further object is to provide means for detachably securing the loader to the side of a wagon so that as the wagon is advanced the loader will also be advanced.

My invention consists in certain details in the construction, arrangement, and combination of the various parts of the device, whereby the objects contemplated are attained, as hereinafter more fully set forth, pointed out in my claims, and illustrated in the accompanying drawings, in which—

Figure 1 is a longitudinal sectional view of the loader looking toward the elevating-carrier and showing in cross-section the conveyer f moving the hay forwardly onto the side-delivery conveyer. Fig. 2 is a plan view of the complete device. Fig. 3 is a cross-sectional view of the device cut through it immediately in front of the rake-supporting wheels, showing one side of the elevating-carrier. Fig. 4 shows the mechanism for holding the conveyer in position relative to the wagon-body. Fig. 5 is a cross-sectional view of the mechanism, showing the side-delivery conveyer in section and the elevating-carrier also in section; and Fig. 6 is a detail view showing the mechanism for operating the rake and the under side of the lower end of the elevating-carrier.

Referring to the accompanying drawings, I have used the reference-numeral 10 to indicate the traction-wheel to which the operating mechanism is connected. The reference-numeral 11 indicates the other of the traction-wheels upon which the rake is mounted. These wheels are connected with each other by the shaft 12. Attached to the shaft 12 in the ordinary way is a series of spring-teeth 13. Extending upwardly from the shaft 12 is an arm 14, to which the mechanism for raising and lowering the teeth is attached, as will hereinafter be more fully described. Mounted at one end of the shaft 12 and adjacent to the traction-wheel 10 is a supporting-bar 14ª, having the downwardly-extending member 15 and the forwardly-extending member 16 therein. At the forward end of the member 16 is a rectangular frame 17, which is securely held in position relative to the member 16 by means of the braces 18 and 19 and which is supported in position relative to the ground-surface by means of the swiveled caster 20. Attached to that end of the shaft 12 which is nearest the traction-wheel 11 is a similar supporting-bar, which I have designated 21 and which has a forwardly-extending member similar to the member 16 and a downwardly-extending member similar to the member 15.

At the forward end of the supporting-bar 21 is a rectangular frame 22, similar in construction to the rectangular frame 17 and braced relative to the supporting-bar 22 in the same way as the rectangular frame 17 is supported relative to the supporting-frame 14ª and also having its forward end supported by means of a swiveled caster, which I have designated by the numeral 23.

The forward portions of the rectangular frames 17 and 22 are connected with each other by means of the boards or metal plates 24, which form one side of the side-delivery conveyer and prevent the hay which is thrown from the conveyer (which elevates the hay forwardly) from being thrown off of the side-delivery conveyer as it is thrown upon it. These frames are also connected by the boards or metal platform 25, around which the side-delivery conveyer travels.

Connecting the upper central portions of the rectangular frames 17 and 22 is the idler-shaft 26, over which the conveyer for moving the hay forwardly passes.

Connecting the extreme lower ends of the supporting-bars 14a and 21 is a shaft 27, which has the sprocket-wheel 28 on that end of it which is outside of the downwardly-extending member 15 and adjacent to the traction-wheel 10.

Passing over the shaft 27 and the shaft 26 is a conveyer 29 for moving the hay forwardly from the rake. This conveyer is preferably made of canvas and has a series of teeth 30 on its outer portion, so that as the conveyer is driven by the shaft 27, which is driven from the traction-wheel 10, (as will more fully hereinafter appear,) this conveyer 29 will take the hay from the rake as it is raked up and draw it forwardly onto the upper portion of the conveyer and cause it to be delivered at a point slightly in front of the shaft 26.

Attached to the inside of the traction-wheel 10 is a sprocket-wheel 31. Passing around the sprocket-wheel 31 and the sprocket-wheel 28 is a sprocket-chain 32, which is so arranged that as the traction-wheel 10 is advanced over the ground-surface and rotated the roller 27 will be correspondingly rotated and will also cause the conveyer 29 to be driven in such a way as to elevate the hay forwardly.

The mechanism for raising and lowering the spring-teeth 13 comprises a link 33, which is pivotally attached to the upper end of the arm 14 at one end and at its other end is pivotally attached to the hand-lever 34, which is pivotally attached at its lower end to the forwardly-extending member 16 of the supporting-bar 14a.

The ordinary mechanism is provided for maintaining the spring-teeth throughout their limit of movement as desired by the operator.

Connecting the sides of the rectangular frame 22 and slightly above the bottom portion thereof is the shaft 34, having a sprocket-wheel 35 at each end thereof.

Mounted immediately in front of the rectangular frame 17 is the shaft 36, having a sprocket-wheel 37 near each end thereof. Passing around the sprocket-wheels 35 and 37 and the shafts 34 and 36 and over and under the boards 25 is the side-delivery conveyer 38, made up of sprocket-chains and slats connecting these chains and teeth in the slats, so that as the conveyer 38 is driven the hay which is delivered on that portion of it which is above the boards 25 will be advanced toward the right side of the machine.

At the extreme rear end of the shaft 36 is a beveled gear 36a, which is in mesh with a beveled gear which drives it.

Mounted at the left end of the conveyer 38 and immediately outside of the rectangular frame 17 is the elevating-carrier frame, made up of an inner section 39 and an outer section 40, which is hinged to the upper end of the inner section at the point 41. Passing over the outer and inner sections is the carrier 42, which is driven from the shaft 43 at the lower end of the inner section 39, which shaft in turn is driven from the traction-wheels, as is pointed out hereinafter.

At the rear end of the shaft 43 is a beveled gear 43a, through which the shaft is driven. This carrier 42 passes over sprocket-wheels 44, which are mounted on the shaft forming the hinge between the two sections and over and under sprocket-wheels 45, which are mounted on a shaft 46 at the extreme outer end of the outer section, and over sprocket-wheels 47, which are mounted on the shaft 48, adjacent to the inner end of the outer section, so that an endless carrier is passed around both the outer and inner sections for elevating the hay as it is fed to this carrier from the side-delivery conveyer. There is an endless belt 49 extending throughout the entire length of the inner section 39 and a slight distance above the carrier 42. This belt has slats 50 extending transversely of it and is designed to hold the hay in position relative to the carrier for elevating the hay as it is operated. This carrier passes around the shaft 51 at the upper end of the inner section 39 and the shaft 52 at the lower end of the inner section 39 and is driven by said shaft.

Mounted on the outside of the traction-wheel 10 is a sprocket-wheel 53.

At the rear side of the lower end of the inner section 39 is a shaft 54, having the sprocket-wheel 55 thereon and having the beveled gear 56 at the inner end thereof in mesh with the beveled gear 36a and having a beveled gear 57 adjacent to the other end thereof in mesh with the beveled gear 43a.

I have provided a sprocket-chain 58, which passes around the sprocket-wheels 53 and 55, so that as the sprocket-wheel 53 is driven by the traction-wheel 10 as the machine is advanced over the ground-surface the shaft 54 will be operated through the sprocket-wheel 55, and consequently drive the shafts 36 and 43 to operate the side-delivery conveyer 38 and the elevating-carrier 42.

Mounted on the shaft 43, immediately in front of the beveled gear 43a, is a gear 59.

Mounted on the shaft 52 is a gear 60 in mesh with the gear 59. It will be seen, therefore, that as the shaft 43, upon which the gear 59 is mounted, is rotated the shaft 52, upon which the gear 60 is mounted, will be rotated and the belt 49 will be driven. It will be seen by an examination of this construction that the entire elevating mechanism will be operated almost directly from the traction-wheel 10.

Mounted on the outer side of the inner section 39 of the carrier are the rollers 61, which are designed to normally rest against the upper side of the wagon-rack 62. When my loader is being used, this will allow for slight forward or rearward movement, also for slight upward and downward movement of either of the wagon-box or of the loader.

Attached to the inner end of the outer section at a point adjacent to the hinge between the two sections and on each side of the outer section is an arm or bar 63, which is securely fixed to the outer section and each of which is braced by means of the brace-rods 64, which are attached to the sides of the outer section 40. At the lower end of each of these bars there is a lug $64^a$, which holds adjustably the shaft 48 in the proper position for supporting the carrier 42.

There is a windlass 65 mounted above the rectangular frame 22, having a pawl 66 and ratchet 67 to hold the shaft against rotary movement except in one direction when the pawl is in engagement with the ratchet. There is a weight 68 at the lower end of the pawl to hold the pawl normally in engagement with the ratchet 67.

Connecting the upper ends of the bars 63 and the windlass 65 are the ropes 69, so arranged that as the windlass is operated the outer section may be swung upwardly and downwardly on its pivot.

Attached to each side of the lower end of the inner section 39 of the elevating-carrier are the brace-rods 70 and 71, which are secured to the carrier by means of the hooks 72 and 73, respectively, which are slipped over the rod 74, attached to the carrier. The brace-rods 70 and 71 are secured at their other ends to the wagon-body by means of the plate 75, which has the hook 76 on it, over which the hooks 77 and 78 are slipped, so that by these rods 70 and 71 the loader is maintained a certain distance away from the wagon-body.

Connecting the central forward portion of the loader with the side of the wagon is a rod 79, which causes the loader to be drawn forwardly as the wagon is advanced over the ground-surface.

Mounted at the rear of the teeth 13 is a transverse shaft 80, having a series of teeth 81 mounted on it and so arranged that these teeth will operate as the shaft is rotated between the spring-teeth 13. The teeth 81 are so shaped that they will assist in forcing the hay upwardly and forwardly as the machine is advanced over the ground. For the purpose of rotating the shaft 80 I prefer to supply the driving connection shown in Fig. 1, which connection comprises a sprocket-wheel $80^a$, fixed at one end of the shaft 80, a short shaft $80^b$, carried by a hanger depending from bracket $80^c$ and having sprocket-wheels $80^d$ and $80^e$ and a sprocket-belt $80^f$, connecting the sprocket-wheels $80^a$ and $80^e$. The sprocket-wheel $80^e$ engages and derives motion from the sprocket-belt 32, and hence it will be seen that when the machine is moved over the ground the shaft $80^a$ will be rotated in the proper direction.

In practical operation the operator first swings the outer section 40 of the carrier from the position shown in Fig. 5 to that shown in Fig. 3. He then attaches the rod 79 to the side of the wagon and the device is in readiness for use. As the wagon is drawn into the hayfield with the loader attached to it the hay will be raked by the spring-teeth and thrown forwardly by these teeth onto the lower end of the conveyer for moving the hay forwardly, which will elevate it a slight distance and allow it to fall upon the side-delivery conveyer 38, which in turn delivers it to the right side of the machine, where it is elevated by the elevating-carrier and delivered into the wagon. As the load increases in height the operator raises the outer end of the outer section. Thus by the use of my comparatively simple device it will be seen that the hay is readily and cleanly raked from the ground and elevated into the wagon which is at the side of the loader, and but little difficulty will be had in loading the hay, owing to the fact that it is delivered into the central portion of the wagon-body.

Having thus described my invention, what I claim, and desire to secure by Letters Patent of the United States therefor, is—

In a hay-loader, the combination of a shaft, traction-wheels mounted on said shaft, supporting-bars mounted on the shaft and having vertical portions arranged in the same vertical plane as and depending from said shaft and portions extending forwardly from the shaft, rectangular frames carried by the forward portions of the supporting-bars, diagonal braces fixed to the forwardly-extending portions of the supporting-bars and the rear ends of the rectangular frames, a board connecting the forward portions of the rectangular frames, a platform also connecting said frames, wheels supporting the forward portions of the rectangular frames, an endless conveyer having stretches arranged above and below said platform, teeth mounted on the shaft, means for rocking and adjustably fixing the shaft, a downwardly and rearwardly inclined endless conveyer having its lower and rear portion carried by the depending portions of the supporting-bars and disposed in front of the teeth and below the shaft and its upper portion disposed above the first-mentioned conveyer, an elevating carrier-frame comprising an inner section fixed with respect to the inner rectangular frame and extending upwardly and an outer section hinged to the upper end of the inner section and having arms fixed to and extending upwardly from its inner portion and also having brace-rods connecting its outer portion and said arms, an elevating-carrier mounted in the elevating-carrier frame, a windlass mounted in the outer rectangular frame, and cables connecting the arms on the outer section of the elevating-carrier frame and said windlass.

JOHN E. DOWDEN.

Witnesses:
R. W. LEVITT,
WILHELMINA BROWN.